United States Patent
Florence

(10) Patent No.: US 7,085,050 B2
(45) Date of Patent: Aug. 1, 2006

(54) POLARIZED LIGHT BEAM SPLITTER ASSEMBLY INCLUDING EMBEDDED WIRE GRID POLARIZER

(75) Inventor: James M. Florence, Dallas, TX (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 10/021,988

(22) Filed: Dec. 13, 2001

(65) Prior Publication Data

US 2003/0112510 A1   Jun. 19, 2003

(51) Int. Cl.
*G02B 5/30* (2006.01)

(52) U.S. Cl. .................. 359/486; 359/495; 349/96

(58) Field of Classification Search .............. 359/486, 359/483, 485, 494, 495, 496, 497, 501, 507, 359/513, 514; 349/193, 194, 96
See application file for complete search history.

(56) References Cited

U.S. PATENT DOCUMENTS

| | | | | |
|---|---|---|---|---|
| 4,688,897 A | * | 8/1987 | Grinberg et al. .............. 349/162 |
| 5,383,053 A | | 1/1995 | Hegg .......................... 359/486 |
| 5,703,861 A | * | 12/1997 | Matsuda ................. 369/110.03 |
| 5,986,730 A | | 11/1999 | Hansen ......................... 349/96 |
| 6,013,339 A | * | 1/2000 | Yamada et al. ............. 428/1.53 |
| 6,081,376 A | | 6/2000 | Hansen ........................ 359/485 |
| 6,108,131 A | | 8/2000 | Hansen ........................ 359/486 |
| 6,288,840 B1 | * | 9/2001 | Perkins et al. ............... 359/486 |
| 2002/0101664 A1 | * | 8/2002 | King et al. ................... 359/629 |
| 2003/0117708 A1 | * | 6/2003 | Kane ........................... 359/513 |
| 2003/0179345 A1 | * | 9/2003 | Ito et al. ........................ 353/20 |
| 2003/0186131 A1 | * | 10/2003 | Enloe ............................. 430/5 |
| 2003/0210379 A1 | * | 11/2003 | Magarill et al. ............... 353/20 |
| 2003/0228759 A1 | * | 12/2003 | Uehara et al. .............. 438/689 |
| 2004/0008416 A1 | * | 1/2004 | Okuno ......................... 359/566 |

FOREIGN PATENT DOCUMENTS

JP       11007027 A   *   1/1999

* cited by examiner

*Primary Examiner*—Arnel C. Lavarias
(74) *Attorney, Agent, or Firm*—David C. Ripma

(57) ABSTRACT

A polarized light beam splitter system provides a polarized light beam splitter including an embedded wire grid polarizer. Spacers ensure a uniform distance between an exposed surface of an internal wire grid polarizer and a corresponding internal surface of a polarized light beam splitter prism so as to ensure a uniform air gap between the two surfaces and within the prism. The spacers typically comprise rigid spheres having a precise predetermined outer diameter. The spacers are generally distributed within an adhesive, such as epoxy, which is used to adhere the exposed surface of the wire grid polarizer to the internal surface of the prism, around the outer edge of the two surfaces. The exposed surface of the wire grid polarizer and the internal surface of the prism are forced together during adhesion so that the two surfaces are uniformly separated by the an air gap having a width having the same dimension as the diameter of a single spacer.

19 Claims, 2 Drawing Sheets

POLARIZED LIGHT BEAM SPLITTER ASSEMBLY INCLUDING EMBEDDED WIRE GRID POLARIZER

FIELD OF THE INVENTION

This invention relates to a polarized light beam splitter assembly including an embedded wire grid polarizer and, more particularly, to an assembly wherein spacers are used to ensure a uniform distance between the embedded wire grid polarizer and an internal surface of the polarized light beam splitter so as to ensure a uniform air gap between the wire grid and the internal surface.

BACKGROUND OF THE INVENTION

Wire grid polarizers are made by fabricating a very fine grid pattern of metal stripes on an outer surface of a thin substrate, typically glass. The fabrication techniques generally use lithographic exposures that are best completed on wafers that can be easily handled by semiconductor fabrication equipment.

When used as a polarized light beam splitter (PBS) control element, the wire grid plate is tilted at a forty five degree angle with respect to a light source to reflect S-polarized light, for example, onto a mirror and a ¼ waveplate, or onto a reflective liquid crystal display (LCD) device. The desired output is modulated to P-polarization and then reflects through the tilted wire grid polarizer. This tilted plate configuration introduces two problems. First, the tilted glass substrate will introduce astigmatism into the projected image. This will cause horizontal and vertical features of the desired projected image to come to focus in separate image planes. The second problem is that the tilted plate occupies a certain space and the projection optics must have sufficient back working distance to operate over the length of that space. This can be a problem if the desired focal length of the projection lens is small.

Most PBS structures use a cubic prism configuration that imbeds the polarizing surface inside a cube of glass. This cubic configuration presents flat sides perpendicular to the optical axis of the projection system which introduces no astigmatism into the projected image. Additionally, because the cube is made of glass having an index of refraction greater than air, the effective back working distance of the projection optics will be reduced.

Wire grid polarizing structures are best manufactured on flat, thin substrates. Currently, there is no convenient method of producing the grids directly on a prism face. Additionally, operation of the wire grid requires air on the metal side of the grid, which prevents the wire grid from being glued or abutted directly against a glass prism face. Due to these manufacturing and operational limitations, there appears to be no prior art solution to fabricate a viable PBS prism using an embedded wire grid polarizer.

SUMMARY OF THE INVENTION

The assembly of the present invention utilizes spacers to ensure a uniform distance between the exposed surface of an internal wire grid polarizer and a corresponding internal surface of the polarized light beam splitter prism so as to ensure a uniform air gap between the two surfaces within the prism. The spacers typically comprise rigid spheres having a precise predetermined outer diameter. The spacers are generally contained within an adhesive, such as epoxy, which is used to adhere the exposed surface of the wire grid polarizer to the internal surface of the prism, around the outer edge of the two surfaces. The exposed surface of the wire grid polarizer and the internal surface of the prism are forced together during adhesion so that the two surfaces are uniformly separated by the width of a single spacer.

Accordingly, an object of the invention is to provide a beam splitter assembly having an embedded wire grid polarizer.

Another object of the invention is to provide a beam splitter assembly having an internal air gap positioned between an exposed surface of a wire grid polarizer and an internal surface of a PBS prism.

A further object of the invention is to provide a beam splitter assembly having a uniform spacing between an internal surface of the assembly and an exposed surface of an internal wire grid polarizer.

Still a further object of the invention is to provide a method of manufacturing a beam splitter assembly having an embedded wire grid polarizer.

These and other objects and advantages of the invention will become more fully apparent as the description that follows is read in conjunction with the drawings.

DETAILED DESCRIPTION OF THE PREFERRED EMBODIMENTS

Figure 1:
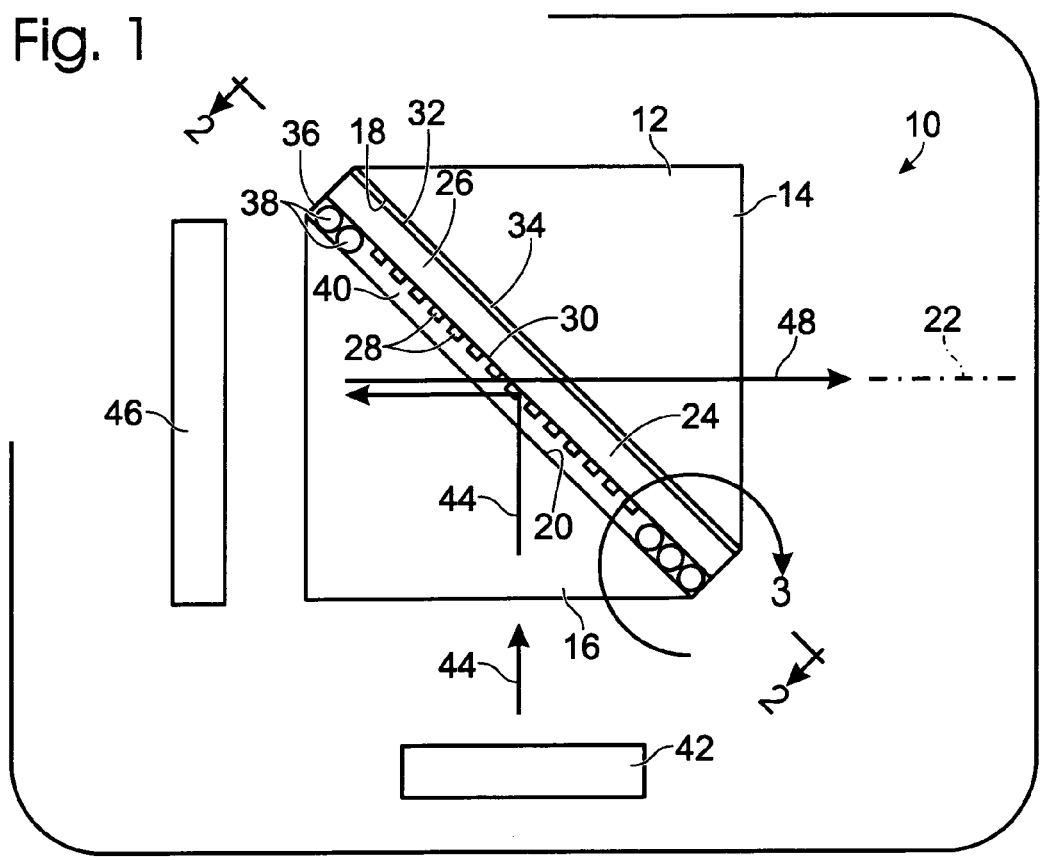
FIG. 1 is a schematic of the polarized light beam splitter assembly including an embedded wire grid polarizer.

Turning now to the drawings, FIG. 1 shows a schematic of the polarized light beam splitter (PBS) assembly 10 including an embedded wire grid polarizer. In particular, assembly 10 includes a polarized light beam splitter prism 12 including first and second halves 14 and 16, respectively. Prism 12 typically comprises a glass cube but other shapes and materials may be utilized as is known in the art. In the preferred embodiment, halves 14 and 16 of prism 12 typically each comprise a triangular section, each section having an internal surface 18 and 20, respectively, wherein surfaces 18 and 20 are positioned at a forty five degree angle to an axis 22 of light emission from the prism.

An internal wire grid polarizer 24 is secured to one of internal surfaces 18 or 20. In the embodiment shown, polarizer 24 is adhered to internal surface 18 of prism section 14. In other embodiments, the wire grid polarizer may be adhered to a surface at an angle other than forty five degrees from the light emission axis, or at a position other than at the diagonal center of the polarized light beam splitter. In the preferred embodiment, wire grid polarizer 24 comprises a thin glass substrate 26 with a wire grid 28 positioned on an external surface 30 of substrate 26. Substrate 26 may be adhered completely across its inner surface 32 to internal surface 18 of prism 12 by adhesive material 34, such as epoxy or glue, or any other means suitable for the particular application. Substrate 26 typically is adhered to surface 18 completely across surface 32 so as to reduce irregularities or spatial differences in the type or the thickness of the securement mechanism positioned within the light path through the prism.

Still referring to FIG. 1, substrate 26 is adhered to second section 16 of prism 12 by adhesive 36, such as epoxy, including spacers 38 distributed therein. Spacers 38 position surface 30 of wire grid polarizer 24 a uniform distance from surface 20 of prism section 16 to create an air gap 40 therebetween. This spacing is more clearly shown in detail region 3, shown in FIG. 3.

Still referring to FIG. 1, assembly 10 comprises a light source 42 which provides, for example, S-polarized light 44. The light source may provide, however, any type or orientation of light as is desirable for a particular application. The S-polarized light 44 is reflected by wire grid polarizer 24 of prism 12 so that the S-polarized light is re-directed toward a reflection device 46, such as a mirror and a ¼ wave plate, or a liquid crystal display device, positioned adjacent prism 12. Of course, other reflection devices as known in the art may also be utilized. Reflection device 46 modulates the S-oriented light to P-oriented light 48 which is reflected back through the embedded tilted wire grid polarizer 24 and along light emission axis 22. As light passes through air gap 40, the small tilted air gap, i.e., tilted with respect to axis 22, introduces some astigmatism to the produced image. However, the astigmatism introduced into the produced image due to air gap 40 is quite small relative to the astigmatism introduced into the produced image by the tilted glass substrate.

Figure 2:
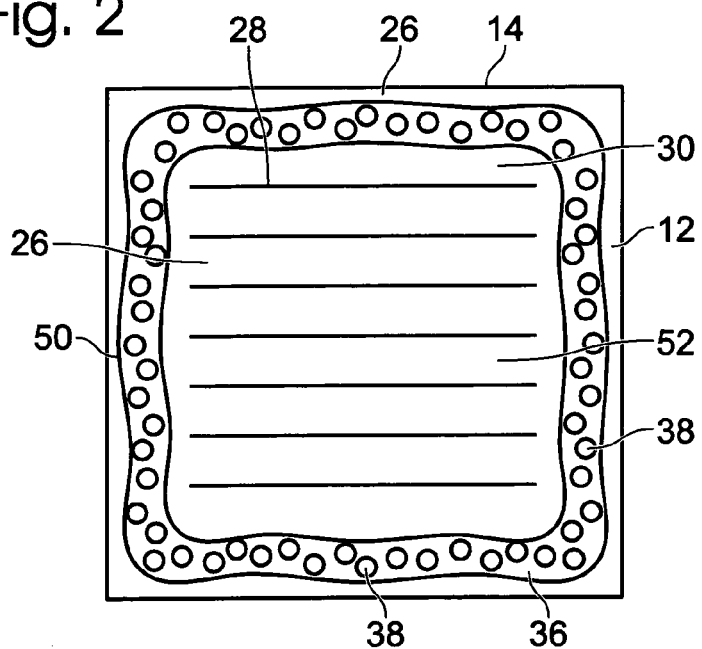
FIG. 2 is a cross sectional view of the polarized light beam splitter assembly taken along line 2—2 of FIG. 1.

FIG. 2 is a cross sectional view of the assembly taken along line 2—2 of FIG. 1. Adhesive 36 is shown positioned around an edge region 50 of substrate 26 so that adhesive 36 does not interfere with light passing through a central region 52 of prism 12. Spacers 38 are shown randomly distributed throughout adhesive 36 in edge region 50.

Figure 3:
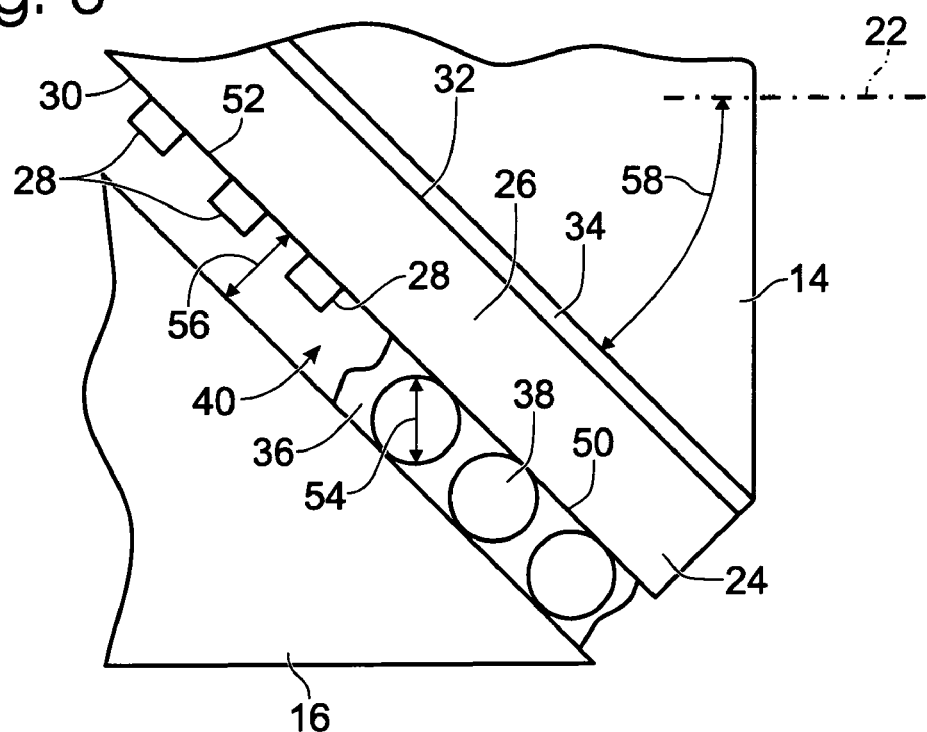
FIG. 3 is a detailed view of the edge region of the assembly of FIG. 1.

FIG. 3 shows a detailed view of the edge region of the internal wire grid polarizer secured within prism 12. Spacers 38 typically are rigid spheres each having a uniform outer diameter 54, wherein the length of diameter 54 is chosen to correspond to a desired width 56 of air gap 40. The spacers typically are distributed within adhesive 36, such as an epoxy. The adhesive is thereafter placed between external surface 30 of wire grid polarizer 24 and internal surface 20 of second prism section 16, around the perimeter 50 of the two surfaces. The perimeter of surface 30 of wire grid polarizer 24 typically does not include any wires (shown in end view in this figure) of wire grid 28. The two prism sections are then forced together so that surfaces 20 and 30 are spaced uniformly from one another by a distance 56, i.e., the diameter of the spacers. In other words, the epoxy will be squeezed from between the spacers and surfaces 20 and 30 so that the spacers will directly contact both surfaces 20 and 30 within the prism. Accordingly, the spherical spacers will hold the two prism sections separated by a predetermined uniform distance. In other embodiments, other shaped spacers may be utilized such as raised rectangular spacers manufactured directly on the perimeter of the glass substrate. In such an embodiment, adhesive would be placed between or around the rectangular spacers to as to secure the two prism sections together.

In the preferred embodiment the internal surfaces of the prism, and the two surfaces of the wire grid substrate are each parallel to one another, and each define an angle 58 of approximately forty five degrees with respect to axis 22 of the assembly. Of course the internal surfaces of the prism may be manufactured at other angles as dictated by each particular application, such as angles in a range of one to eighty nine degrees.

In one embodiment each of spacers 38 may have a diameter 54 of approximately 10 μm. In other embodiments the spacers may have a smaller or a larger diameter, such as a diameter in a range of 1 to 30 μm, so as to provide a corresponding width air gap 40. However, if spacers having too small a diameter are used, the resulting air gap will be too thin and will cause reduced PBS performance by evanescent coupling of the light waves from one prism block section to another. The diameter of the spacers used, therefore, should be chosen according to the particular dimensions and qualities of the prism and light being used. In each particular embodiment, each of the spacers distributed within epoxy 36 typically will have the same diameter or height 54 as the other spacers. This will ensure a uniform air gap between the two prism sections. However, smaller sized spacers may be used within an epoxy containing larger sized spacers, wherein the large sized spacers will define the width of the air gap.

Thus, a polarized light beam splitter having an internal wire grid polarizer, and a method of manufacturing the same, has been disclosed. Although preferred structures and methods of manufacturing the device have been disclosed, it should be appreciated that further variations and modifications may be made thereto without departing from the scope of the invention as defined in the appended claims.

I claim:

1. A polarized light beam splitter assembly comprising:
   a polarized light beam splitter prism including:
      a first internal surface; and
      a second internal surface;
   a wire grid polarizer including:
      a first surface secured to the prism first surface;
      a second surface raised from and parallel to the polarizer first surface, with a perimeter region and a central region;
   an adhesive formed between the polarizer second surface perimeter region and the prism second surface;
   an air gap cavity between the prism second surface and the polarizer second surface central region, surrounded by the adhesive; and
   a wire grid attached to the polarizer second surface central region, with a height extending into the air gap cavity.

2. The assembly of claim 1 wherein the air gap cavity has an area defined by the polarizer second surface perimeter region and a height defined by the maximum thickness of the adhesive.

3. The assembly of claim 2 wherein the adhesive has a uniform maximum thickness defined between the polarizer second surface and the prism second surface; and
   wherein the polarizer wire grid height is less than the adhesive maximum thickness.

4. The assembly of claim 3 wherein the air gap cavity has a volume defined by the product of the maximum adhesive thickness and the air gap cavity area.

5. The assembly of claim 4 further comprising:
   spacers having a uniform size embedded in the adhesive; and
   wherein the adhesive maximum thickness is defined by the spacer size.

6. The assembly of claim 5 wherein the spacers have a spherical shape with a diameter; and
   wherein the adhesive maximum thickness is equal the spacer diameter.

7. The assembly of claim 5 wherein the adhesive maximum thickness is in the range of 1 and 30 microns.

8. The assembly of claim 5 wherein the spacers are formed on the polarizer second surface.

9. The assembly of claim 1 wherein the prism is a glass cube split into interfacing first and a second sections, wherein the prism first surface is formed on the prism first section interface and the prism second surface is formed on the prism second section interface.

10. The assembly of claim 9 wherein the cube defines an elongated axis and wherein the prism first and second surfaces have an angle, defined with respect to the elongated axis, in the range between 1 and 89 degrees.

11. The assembly of claim 1 further comprising:
a light source positioned to emit light;
a reflection device; and
wherein the polarizer second surface accepts light from the light source and redirects the light toward the reflection device.

12. The assembly of claim 11 wherein the reflection device is device chosen from the group including a liquid crystal display panel, a mirror, and a quarter wave plate.

13. A polarized light beam splitter assembly, the assembly comprising:
a prism having a source axis oriented to accept light in a first polarization and an emission axis to supply light in a second polarization;
a polarizer embedded in the prism, including a glass substrate with parallel first and second surfaces, and a wire grid formed overlying the glass substrate first surface; and
an air gap cavity interposed between the glass substrate first surface and the prism, surrounded by an adhesive.

14. The assembly of claim 13 wherein the prism has a first interior surface and a second interior surface;
wherein the glass substrate first surface has a perimeter;
wherein the adhesive has a uniform maximum thickness interposed between the glass substrate first surface perimeter and the prism first interior surface; and
wherein the air gap cavity is formed by prism first interior surface, the glass substrate first surface, and the adhesive.

15. The assembly of claim 14 further comprising:
uniformly sized spacers embedded in the adhesive.

16. The assembly of claim 14 wherein the wire grid has a height; and
wherein the adhesive maximum thickness is greater than the wire grid height.

17. The assembly of claim 14 wherein the adhesive maximum thickness is in the range of 1 and 30 microns.

18. The assembly of claim 13 further comprising:
a light source to supply the light;
a reflection device; and
wherein the wire grid accepts light from the light source and redirects the light toward the reflection device.

19. The assembly of claim 18 wherein the reflection device is device chosen from the group including a liquid crystal display panel, a mirror, and a quarter wave plate.

* * * * *